United States Patent [19]

Szollmann

[11] 4,292,999

[45] Oct. 6, 1981

[54] VALVE FOR TOY BALLOONS

[76] Inventor: Anton Szollmann, Augartenstrasse 21, 7500 Karlsruhe, Fed. Rep. of Germany

[21] Appl. No.: 119,351

[22] Filed: Feb. 7, 1980

[30] Foreign Application Priority Data

Feb. 7, 1979 [DE] Fed. Rep. of Germany ....... 2904514

[51] Int. Cl.³ ..................... F16K 15/20; G09F 21/06; A63H 27/10
[52] U.S. Cl. .................................. 137/560; 40/214; 46/88; 46/226; 137/855; 137/232; 362/96; 362/253
[58] Field of Search ................ 46/87, 88, 89, 90, 226, 46/228; 137/855, 232, 560; 40/214; 362/253, 96

[56] References Cited

U.S. PATENT DOCUMENTS

| | | | |
|---|---|---|---|
| 1,229,794 | 6/1917 | Saltzer | 46/88 X |
| 1,370,178 | 3/1921 | Albert | 137/855 X |
| 1,776,182 | 9/1930 | Cook | 40/214 X |
| 1,848,179 | 3/1932 | Kiester | 362/96 |
| 2,383,390 | 8/1945 | Jacobs | 46/89 X |
| 2,565,679 | 8/1951 | Dunn et al. | 46/90 |
| 2,663,968 | 12/1953 | Longino | 46/88 X |
| 2,839,073 | 6/1958 | Marsh | 137/232 |
| 3,107,863 | 10/1963 | Potapenko | 362/96 |

FOREIGN PATENT DOCUMENTS

| | | | |
|---|---|---|---|
| 800465 | 5/1936 | France | 137/855 |
| 1016073 | 8/1952 | France | 40/96 |
| 1414922 | 9/1965 | France | 137/855 |

Primary Examiner—F. Barry Shay
Attorney, Agent, or Firm—Brady, O'Boyle & Gates

[57] ABSTRACT

The invention relates to a valve for toy balloons, this valve opening inwardly under very minor excess pressure and yet providing a tight seal by means of an additional cap. A container surrounding the valve and flaring conically serves for introducing the valve into the balloon aperture without the need for a special mounting or sealing means. The container is sealed by a removable lid containing the cap and simultaneously making it possible to introduce an internal illumination for the balloon.

5 Claims, 4 Drawing Figures

VALVE FOR TOY BALLOONS

FIELD OF THE INVENTION

The invention relates to a valve for toy balloons, this valve offering almost no additional resistance during the inflating of the balloon and being distinguished by absolute tightness against the escape of air or gas from the balloon even over a long period of time.

BACKGROUND OF THE INVENTION

It is known to tie off or simply knot the filling end of a balloon after the latter has been filled with air or a gas. However, in such a case it is possible only with difficulties to additionally replenish the air of a flaccid balloon or even to depressurize the balloon after use and refill the same upon reuse.

The invention is based on the object of overcoming this deficiency and furthermore of taking care to provide the balloon, if desired, additionally with internal illumination.

SUMMARY OF THE INVENTION

The valve for toy balloons according to the invention is characterized by a short, strong ring on one end of which is connected a thin valve flap extending laterally of the bore thereof. The thin valve flap is connected to the short ring by a thin connecting web or hinge portion, and the valve flap does not touch the inner bore of the ring. The ring is inserted in one end of a small tube in such a way that an annular valve seat in the tube is disposed in front of the valve flap, and outward pressure is adapted to maintain the valve flap in sealing engagement with the valve seat. The other end of the tube is sealed by a cap which can be tightly placed thereon.

Advantageously, care is likewise taken that the tube with the valve seat is connected at the end and on the side to the bottom of a container, which latter flares conically in the upward direction, and that the other end of the tube projects past the upper rim of the container. To provide a satisfactory friction adherence of the resilient balloon skin to the container, it is advantageous to provide the outside of the container with a plurality of concentric, annular beads.

In a further embodiment of the invention, the open end of the container is sealed by a lid forming an integral part of the attachable cap of the tube; the rim of the lid may be provided with an annular groove resiliently engaged by an annular bead on the rim of the container, so that the lid can be removed and reinstalled without effort, without any substantial amounts of gas being able to escape from the balloon in the meantime.

The lid may be equipped with cutouts for the insertion and mounting of an electrical illumination fixture in the container in the space adjacent the small tube, so the balloon can be illuminated from the inside and can also be provided, for example, with various glued-on patterns on the outside.

BRIEF DESCRIPTION OF THE DRAWINGS

The drawings illustrate a valve for toy balloons according to the invention in one embodiment in which.

DESCRIPTION OF THE PREFERRED EMBODIMENTS

Figure 1:
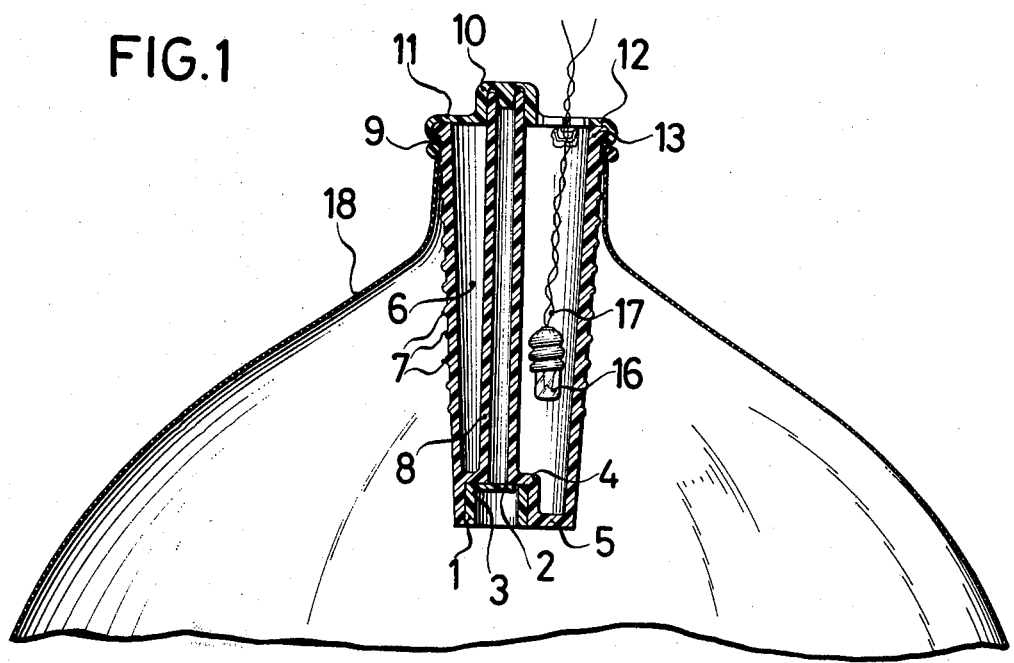
FIG. 1 is a longitudinal sectional view showing the valve of the invention, including the surrounding housing or container therefor, accommodated within a fragmentary showing of an inflated balloon.
Figure 2:
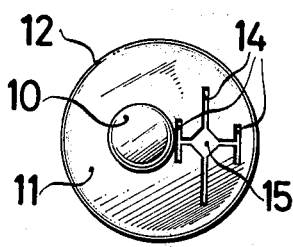
FIG. 2 is a top plan view of the valve housing including the valve, but without the balloon.
Figure 3:
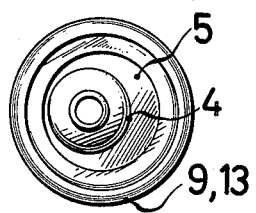
FIG. 3 is a top plan view of the valve with housing, but without the lid.
Figure 4:
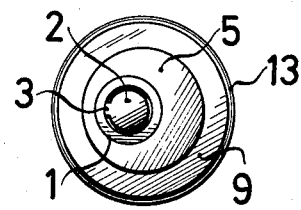
FIG. 4 is a bottom view of the valve and the surrounding housing or container.

Referring to the drawings in greater detail, the most essential component of the invention is constituted by a strong, short ring 1, for example of polyvinyl chloride; at one end of this ring, a thin valve flap 2 is slightly resiliently fixedly connected by a connecting web or hinge portion 3. The valve flap 2 extends laterally of the bore of the ring. The ring 1 is seated in a cylindrical recess 4 at the bottom 5 of a container 6, which latter is preferably circular in cross-section and flares conically in the upward direction and has annular beads 7 on the outside thereof. Starting with the cylindrical recess 4, a small tube 8 in communication with the recess extends upwardly from the lateral wall of the recess to such an extent that it projects past the upper outer rim 9 of the container 6. The lower end of the small tube 8 or the surface of the lateral wall of the recess and surrounding the tube 8 forms a seat for the valve flap 2 which covers the communicating passage of the tube 8 with the recess 4. A cap 10 forming a portion of a lid 11, the rim 12 of which is retained by an annular bead 13 at the upper end of the container 6, fits tightly on the overlapping upper end of the tube 8.

Adjacent the cap portion 10 of the lid 11, slots 14 and an aperture 15 are provided for the convenient introduction and sufficient fastening of an incandescent light bulb 16 and its associated fixture and electrical leads 17. The diameter of small tube 8 is relatively small in comparison with the diameter or bore of container 6, and by offsetting the axis of tube 8 relative to the axis of container 6, a substantial space interior of container 6 adjacent the tube 8 is provided to accommodate the electrical illumination assembly, while maintaining the diameter of the container 6 at a minimum.

The filling of a balloon 18 having a valve according to the invention is conducted as follows:

A balloon 18 to be inflated is pushed with the open, hose-like end almost up to the outer rim 9 of the container 6 and then, after removing the lid 11, air or gas is introduced through the upper open end of the tube 8. During this step, the valve flap 2 moves about its hinge portion 3 without marked resistance into the interior of the ring 1 and, after termination of the filling of the balloon, with the assistance of the increased pressure inside the inflated balloon, moves back to its original position in contact with the lower end of the small tube 8 or the inside of the bottom of the cylindrical recess 4 which form a seat for the valve flap. The flap and seat form an effective seal against the escape of gas from the inflated balloon and to safely avoid even a minor escape of the content of the balloon, the lid 11 is thereupon again placed on the upper rim 9 of the container 6, the cap portion 10 tightly sealing the upper end of the tube 8. If desired, a small incandescent light bulb 16 with its fixture and lead wires 17, or also a small battery operated flashlight, can be inserted through the slots 14 and the aperture 15 in the lid 11, into the interior space adjacent the small tube 8 in the housing or container 6. The housing or container 6 is constructed of transparent or translucent material such as plastics, so that when the light bulb 16 is illuminated the balloon 18 is thus provided with a soft and yet well visible interior lighting.

Instead of toy balloons, it is, of course, also possible to equip the bladders of footballs, beach balls, balls with advertising logos, or any other inflatable articles of a synthetic resin with the valve of this invention, for example by constructing the last annular bead 7 before the rim 9, 13 of the container as a flange heat-sealed to the article of plastic. It is furthermore possible for the lead wire 17 for the incandescent bulb to form an entire string as customary in the electrical lighting of Christmas trees, since the bulb fixture can be pushed through the flexible slots and apertures in the lids 11. To deflate the balloon, the lid 11 is removed, and a knitting needle, for example, is introduced into the small tube 8 and temporarily pushes the valve flap 2 off of its seat to the open position.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

What I claim is:

1. A valve assembly for toy balloons and the like, comprising a container (6) having a bottom (5) and an upper open rim (9), a ring (1) having a bore, a thin valve flap (2) connected on one end of said ring by a flexible connecting portion (3), said valve flap extending laterally of and spaced from the bore of said ring, a tube (8), an annular valve seat (4) in said tube adjacent the inner end thereof, said tube (8) and annular valve seat (4) connected at the inner end and on the side of said tube to the bottom (5) of said container (6), said container (6) flaring conically in the upward direction and spaced in surrounding relation to said tube (8) forming an open top interior cavity therebetween, said ring connected in the inner end of said tube such that said annular valve seat (4) is disposed in front of and in moveable contact with said valve flap (2), said tube having an outer end projecting above the upper open rim (9) of said container, and a removable cap (10) adapted for sealing engagement with the outer end of said tube.

2. A valve assembly for toy balloons and the like, as set forth in claim 1 in which said tube (8) and container (6) have axes that are parallel and offset relative to each other.

3. A valve assembly for toy balloons and the like, comprising a container (6) having a bottom (5) and an upper open rim (9), a ring (1) having a bore, a thin valve flap (2) connected on one end of said ring by a flexible connecting portion (3), said valve flap extending laterally of and spaced from the bore of said ring, a tube (8), an annular valve seat (4) in said tube adjacent the inner end thereof, said tube (8) and annular valve seat (4) connected at the inner end and on the side of said tube to the bottom (5) of said container (6), said container (6) flaring conically in the upward direction, said ring connected in the inner end of said tube such that said annular valve seat (4) is disposed in front of and in moveable contact with said valve flap (2), said tube having an outer end projecting above the upper open rim (9) of said container, a removable cap (10 adapted for sealing engagement with the outer end of said tube (8), and a lid (11) forming an integral part with the removable cap (10) adapted for engagement with the upper open rim (9) of said container.

4. A valve assembly for toy balloons and the like, as set forth in claim 3, in which said upper open rim (9) has an annular bead (13) thereon, and said lid (11) has a rim (12) with an annular internal groove adapted to resiliently engage said annular bead (13).

5. A valve assembly for toy balloons and the like, as set forth in claim 3, in which said container defines an interior space adjacent said tube (8), an electrical illumination assembly (16, 17), and said lid (11) having cutout portions (14) for the penetration and mounting of said electrical illumination assembly in the interior space of the container.

* * * * *